(12) United States Patent
Górecki

(10) Patent No.: US 12,041,999 B2
(45) Date of Patent: Jul. 23, 2024

(54) SMART RESCUE HELMET, ESPECIALLY FOR FIREFIGHTERS

(71) Applicant: BRANDBULL POLSKA SPOLKA AKCYJNA, Warsaw (PL)

(72) Inventor: Kamil Górecki, Bydgoszcz (PL)

(73) Assignee: Brandbull International S.A. Oddzial w Polsce, Kalisz (PL)

(*) Notice: Subject to any disclaimer, the term of this patent is extended or adjusted under 35 U.S.C. 154(b) by 0 days.

(21) Appl. No.: 17/565,836

(22) Filed: Dec. 30, 2021

(65) Prior Publication Data

US 2023/0146974 A1 May 11, 2023

(30) Foreign Application Priority Data

Nov. 9, 2021 (PL) .......................................... 439484

(51) Int. Cl.
*H04N 7/00* (2011.01)
*A42B 3/30* (2006.01)
*G02B 27/01* (2006.01)
*H04N 5/33* (2023.01)
*H04N 7/18* (2006.01)
*G06F 3/147* (2006.01)
*H04B 1/38* (2015.01)
*H04W 4/80* (2018.01)

(52) U.S. Cl.
CPC ............ *A42B 3/30* (2013.01); *G02B 27/0172* (2013.01); *H04N 5/33* (2013.01); *H04N 7/181* (2013.01); *G02B 2027/0138* (2013.01); *G02B 2027/014* (2013.01); *G02B 2027/0141* (2013.01); *G06F 3/147* (2013.01); *H04B 1/38* (2013.01); *H04W 4/80* (2018.02)

(58) Field of Classification Search
CPC ................. A42B 3/30; G02B 27/0172; G02B 2027/0138; G02B 2027/014; G02B 2027/0141; H04N 5/33; H04N 7/181; G06F 3/147; H04B 1/38; H04W 4/80
See application file for complete search history.

(56) References Cited

U.S. PATENT DOCUMENTS 9,615,067 B1 * 4/2017 Foote ..................... H04N 7/185
11,477,418 B2 * 10/2022 Fertitta .................. H04N 7/185
(Continued)

FOREIGN PATENT DOCUMENTS

CN 203468597 U * 3/2014
PL 294473 A1 11/1993
(Continued)

OTHER PUBLICATIONS

Translation to CN-203468597-U.*

*Primary Examiner* — Frank F Huang
(74) *Attorney, Agent, or Firm* — Cherskov Flaynik & Gurda, LLC

(57) ABSTRACT

A smart rescue helmet for use by a rescuer at an action site is described. It includes a number of features enclosed in an outer shell which includes a shock-absorbing canopy and a visor. The features include a control module comprising a microcomputer contained inside the smart rescue helmet, a near-field display, a visible band camera, a thermal imaging camera, a sensor module monitoring physiological parameters along with a position of the rescuer; and a communication system.

7 Claims, 3 Drawing Sheets

(56) References Cited

U.S. PATENT DOCUMENTS

| | | | | |
|---|---|---|---|---|
| 2002/0009978 | A1* | 1/2002 | Dukach | G08G 1/01 |
| | | | | 455/457 |
| 2008/0170119 | A1* | 7/2008 | McCann | G02B 27/017 |
| | | | | 348/113 |
| 2010/0007498 | A1* | 1/2010 | Jackson | G06K 7/10366 |
| | | | | 340/572.1 |
| 2015/0157079 | A1 | 6/2015 | Auranen et al. | |
| 2017/0225336 | A1* | 8/2017 | Deyle | B25J 5/007 |
| 2019/0266414 | A1* | 8/2019 | Stawiszynski | G06V 20/53 |
| 2021/0208949 | A1* | 7/2021 | Bijwe | G06F 9/5005 |

FOREIGN PATENT DOCUMENTS

| | | |
|---|---|---|
| PL | 302864 A1 | 10/1994 |
| PL | 125198 U1 | 12/2017 |
| PL | 125199 U1 | 12/2017 |
| PL | 127745 U1 | 2/2019 |

\* cited by examiner

SMART RESCUE HELMET, ESPECIALLY FOR FIREFIGHTERS

The instant application claims priority to a foreign filing in Poland, serial number P.439484, filed on Nov. 9, 2021, presently pending. The contents of that filing are hereby incorporated by reference.

BACKGROUND OF THE INVENTION

1. Field of the Invention

The field of the invention is a smart helmet for rescuers, mainly firefighters. The helmet is intended for head protection, but also for communication in a broad sense, mainly with the command center, and thanks to devices placed in it, make rescuer's and/or firefighter's work safer and more effective.

BACKGROUND OF THE INVENTION

Rescue helmets, especially firefighters' helmets for protecting the rescuer/firefighter's head against splinters of solid objects and mechanical injuries consisting of a shell in shape similar to a hemisphere, are known and widely used. These helmets have an inner construction formed by a retention system with attached straps and protective padding with easy adjustment on all axes, edge protection, and neck protection. Rescue helmets are also equipped with a number of additional accessories and sockets as required. A common piece of equipment used by the rescuer/firefighter during rescue operations is a radio communication kit for use with helmets and masks. If it is not possible to hide a boom microphone or an ear microphone under a protective suit, a headset with a bone conduction microphone becomes an alternative.

The invention is known from patent description P.302864 with convention priority number DE934310793, which relates to a tactile microphone 1 that is in contact with a solid body whose acoustic vibrations it is intended to receive. The tactile microphone has a base 3 in which an electronic circuit is arranged. Elastic bellows 4 are placed on the underside of the base 3, and a proper microphone is placed on the inner side of the bottom thereof.

The invention is known from Application No. US2015157079 for an internal structure for a helmet that is shaped to be worn on a wearer's head and protects the wearer from external elements. The internal helmet structure includes one or more connecting ports for connecting an electronic device, a control interface for connecting a control unit, a wiring arrangement for connecting one or more connecting ports to the control interface, and a mounting arrangement for attaching an accessory to the internal structure. Further, the internal structure of the helmet having a shape to protect the head of the wearer from external impact is detachably attached to the helmet.

A special element of the rescue helmet is a movable face and eye shield in the front part, the so-called visor.

There is known from patent description P.294473 a protective head, face, and an eye shield with an automatically dimming visor, consisting of a protective mask 1 equipped with a visor 2, having the form of a transmissive liquid crystal panel, which consists of a glass case, provided on its outer surfaces with polarizers of mutually perpendicular directions of polarization planes, and on its inner surfaces uniform optically transparent electrodes are applied. A layer of liquid crystal is placed between the electrodes in such a way that the molecules of liquid crystal adhering to the electrodes, when the panel is not turned on, have an orientation in accordance with the directions of the polarizers. A protective filter and an optical corrective filter are placed on the outer surfaces of the housing. The panel through a detector 3, a control circuit 4 is connected to a power supply circuit 5, equipped, inter alia, with a solar battery.

The visor of a rescue helmet, especially a firefighter helmet, known from utility model description W. 127745, constituting a pivoting element on the helmet shell and serving as a face shield for the user, is characterized by the fact that it is integrally equipped with a micro display 7 and a lens system 7a for receiving an image from a camera 6 integrated into the helmet 1.

A firefighter helmet is known from utility model description W.125198 is characterized by the fact that it is additionally equipped with a thermal imaging camera 6 mounted on the shell 1 of the helmet and a micro display 7 with a lens 7a cooperating wirelessly with the camera, mounted at the end of the boom 8, which has an adjustment 9 for the vertical position of the micro display 7 and an adjustment 10 for the horizontal position of the micro display 7, and furthermore is provided with a stop 11 to ensure a stable angular position and a stable deflection when the camera 6 is not in use. Whereas, the firefighter helmet from utility model W. 125199 is characterized by the fact that it is additionally equipped with a thermal imaging camera 6 mounted on the shell 1 of the helmet and a micro display with a lens 7 cooperating with the camera, mounted integrally on the face shield, that is the visor 2.

As can be seen from the above examples, new technologies are also entering the rescue service, including fire rescue in a special way. A firefighter helmet, which is supposed to perform first of all the function of head protection, is at the same time, through its proximity with organs of perception, more and more often used in various ways to monitor the environment in difficult conditions, to collect information in situation of limited visibility, to analyze collected information, to transmit this information to the command center or to other rescuers and/or firemen. All this is to increase the safety of the rescuer-firefighter and to collect information about the course of rescue action in order to be able to analyze the course of action and to develop even better techniques for conducting rescue operations in the future.

A smart rescue helmet, especially a firefighter helmet according to the invention, gives a tool for fulfilling these aims. It solves the problem of preserving greater safety of rescuer or firefighter's work and at the same time gives him equipment, which enables greater effectiveness of work now and in the future.

SUMMARY OF THE INVENTION

The essence of the invention is a smart rescue helmet, especially a firefighter helmet made of a shell in the shape similar to a hemisphere, equipped inside with a shock-absorbing canopy and a retention system and also in the front part with a rotating visor, which is equipped with a control module in the form of a microcomputer, a near-field display, a visible band camera and a thermal imaging camera, a module of sensors monitoring physiological parameters and the position of the firefighter and a system of communication with the command center where the data readings are properly processed and stored in a dedicated database. The near-field display is built on a mini LCD screen with a bright backlight and an optical prism allowing for a wide-angle field of vision. The visible band camera records images from the action site, and the compressed video stream is transmitted via CPU to the command center and the integrated thermal imaging camera has an additionally radiometric function; moreover, the image from the thermal imaging camera is fed directly to the firefighter's mini near-field display. The module of sensors of physiological parameters of a rescuer and the accelerometer sensors are mounted in the helmet's housing in the place of contact with the skin and the information from the sensors is sent to the CPU of the networked Smart helmet.

Advantageously, the control module is a microcomputer performing the function of controlling a battery power circuit, a wireless communication circuit, a thermal imaging camera circuit, a video camera circuit, a near-field display circuit and monitoring of physiological parameter sensors and accelerometer data.

Advantageously, the optical prism of the near-field display allows for a field of vision of at least 17 degrees, and the 1000nit backlighting allows for a clear image regardless of ambient light conditions.

Advantageously, the thermal imaging camera 4 is built on a longwave detector in the infrared LWIR band with a mechanical shutter.

Advantageously, the thermal imaging camera image 4 is configurable in several color variants according to the action being performed. The variant selection is performed wirelessly via a smartphone application to which the CPU connects upon start-up.

Advantageously, firefighters' vital signs sensors along with the parameters of all modules are broadcast via Bluetooth in the form of simple messages and the smart helmet scans the readings, determines the direction and distance from where the message was transmitted, and transmits it to the command center using the MQTT information exchange protocol along with information about the time when it was transmitted by the source device.

BRIEF DESCRIPTION OF THE DRAWINGS

The invention, together with the above and other objects and advantages, will be best understood from the following detailed description of the preferred embodiment of the invention shown in the accompanying drawings, wherein.

DETAILED DESCRIPTION OF THE INVENTION

The previous summary and the following detailed description of specific embodiments of the present invention will be better understood when read in conjunction with the appended drawings.

As used herein, an element or step recited in the singular and proceeded with the word "a" or "an" should be understood as not excluding plural said elements or steps unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
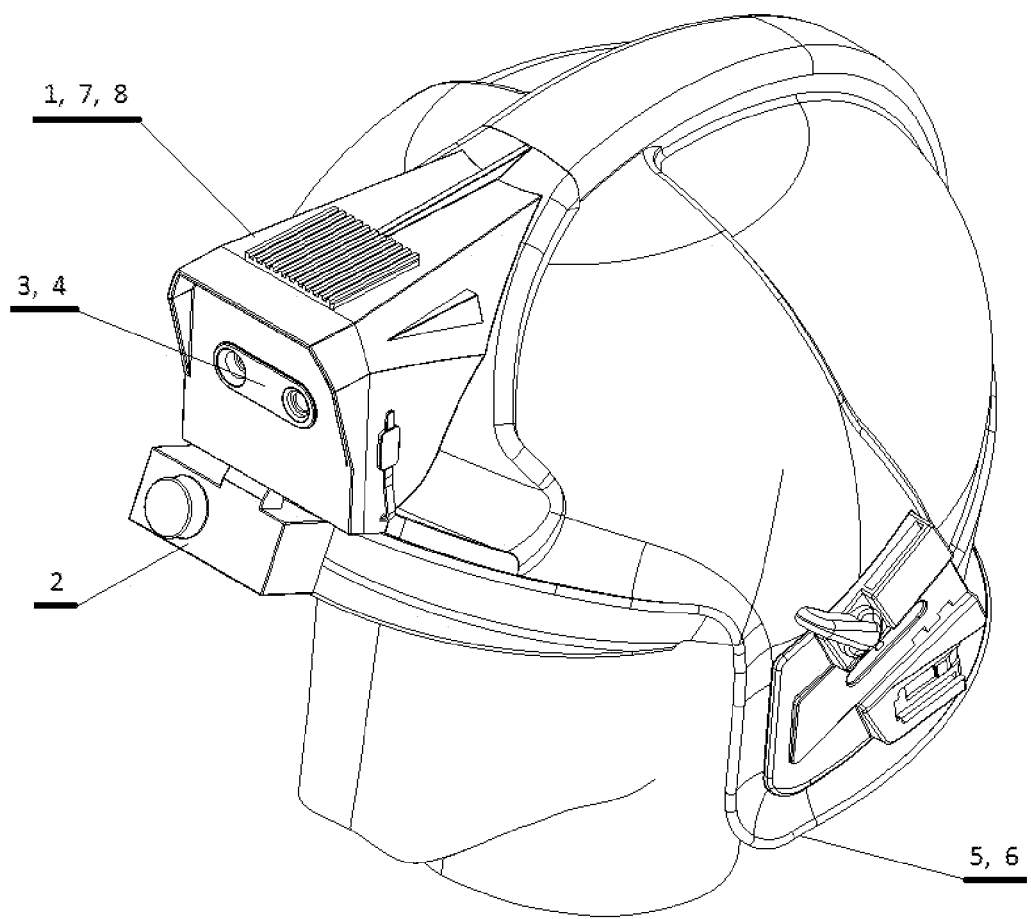
FIG. 1 depicts a front view of one embodiment of the invention.
Figure 2:
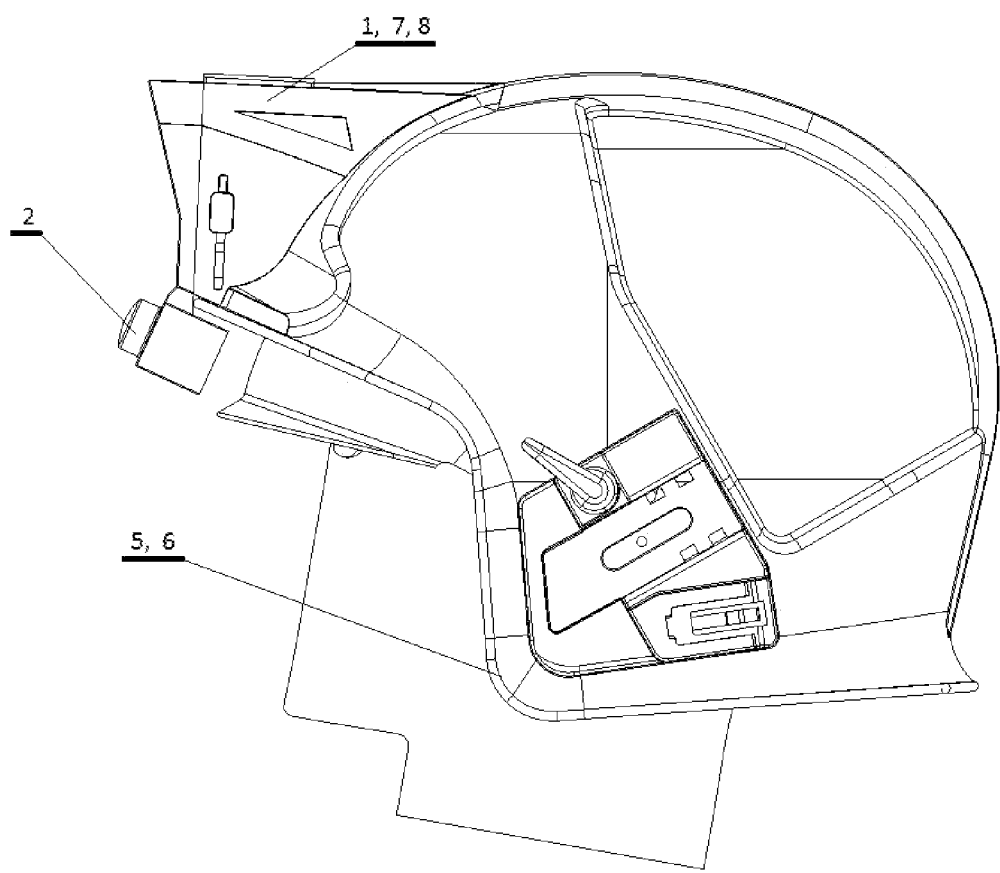
FIG. 2 depicts a side view of one embodiment of the invention.
Figure 3:
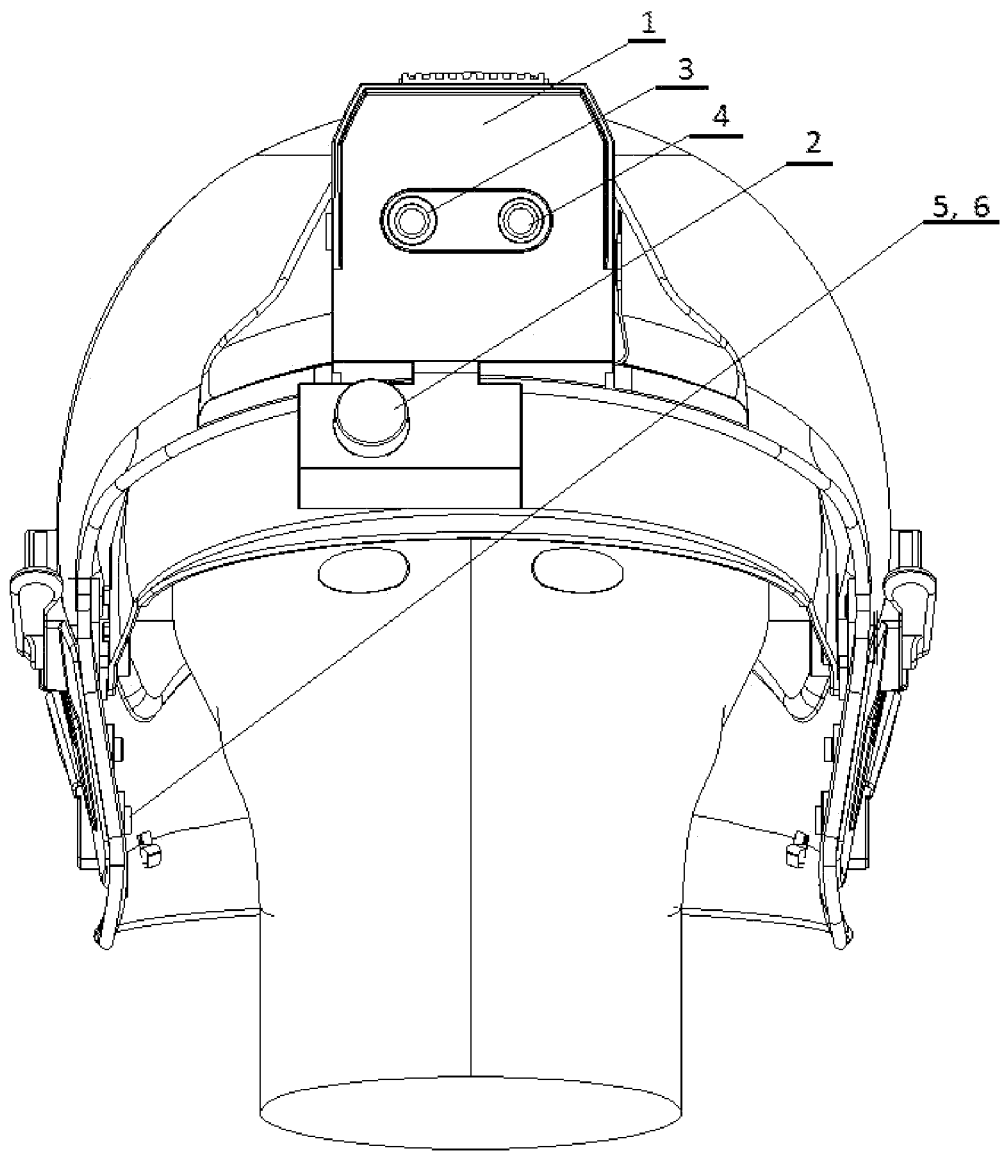
FIG. 3 depicts another front view of one embodiment of the invention.

The object of the invention is shown in an example of the implementation in the drawing, in which FIG. 1 shows a smart firefighter helmet in axonometric view in front and side view, FIG. 2 shows a smart firefighter helmet in a side view, FIG. 3 shows the smart firefighter helmet in another front view.

A smart rescue helmet, especially a firefighter helmet formed of a shell in the shape similar to a hemisphere, equipped inside with a shock-absorbing canopy and a retention system and also in the front part with a rotatable visor, is characterized by the fact that it is equipped with a control module 1 in the form of a microcomputer 8, near-field display 2, a visible band camera 3 and a thermal imaging camera 4, a module of sensors monitoring physiological parameters 5 and the position of the firefighter 6 and a system of communication 7 with the command center where the data readings are appropriately processed and stored in a dedicated database.

The control module in the form of microcomputer 8 is based on a four-core 64-bit processor in RAM architecture, performing the functions of controlling the battery power system, 2.4 GHz and 5.0 GHz IEEE 802.11b/g/n/ac wireless communication, Bluetooth 5.0, BLE, controlling the thermal imaging camera system, controlling the video camera system, controlling the near-field display system, monitoring the physiological parameter sensors and accelerometer data to determine the firefighter's spatial orientation.

In the firefighter's field of vision, there is a near-field display 2 mounted that is built on a mini LCD screen with a resolution of 640×320 pixels and a diagonal of 0.26", with bright backlighting and an optical prism allowing a field of vision angle of 17 degrees. Display backlighting at 1000 nits allows for a clear picture regardless of external lighting conditions.

A visible band camera 3 captures the scene, and the compressed video stream is transmitted via CPU to the command center.

The integrated thermal imaging camera 4 on a longwave infrared detector LWIR with a mechanical shutter has a radiometric function and additionally the image from the thermal imaging camera 4 is fed directly to the near-field mini-display 2 of the firefighter supporting observation of the rescue operation site in poor visibility conditions while leaving the rescuer free to move, so called "hands-free". The thermal imaging camera image 4 is configurable in several color variants, according to the action, whereby the selection of the variant is performed wirelessly by means of an application on a smartphone, with which the CPU connects upon activation.

An independently powered sensor module 5 of the rescuer's physiological parameters and accelerometer sensors are mounted in the helmet housing at the skin contact point, and the information from the sensors is sent to the networked Smart Helmet CPU.

Firefighters' vital signs sensors along with parameters of all modules are broadcast via Bluetooth Low Energy 5.1/5.2 in the form of simple messages, and the smart helmet scans the readings, determines the direction and distance from which the message was broadcast, and transmits them to the command center using MQTT information exchange protocol along with information about the time when it was broadcast by the source device. At the command center, the data readings are processed accordingly and stored in an InfluxDB or approximate (time-series database). Based on the direction and distance of other helmets from the smart helmet according to the invention, a graph is created, and a real-time map of the firefighters is drawn. The position relative to each other is determined using triangulation and trilateration. Readings from other sensors are indicated on the map, respectively. When the data overlap, the data can be linked to the data scanned from the other helmet, which will merge the two graphs into one whole.

Based on the accelerometer, gyroscope, and distance and direction data, it draws a map of how the firefighter with the smart helmet has moved since the device was turned on. This can also be used to map doors and passageways in a building.

In summary, a smart rescue helmet, especially a firefighter helmet is formed from a shell in the shape similar to a hemisphere, equipped inside with a shock absorbing canopy and a retention system and also in the front part with a rotating visor, is characterized by the fact that it is equipped with a control module 1 in the form of a microcomputer 8, a near-field display 2, a visible band camera 3 and a thermal imaging camera 4, a sensor module monitoring physiological parameters 5 and the position of the firefighter 6 and communication system 7 with the command center where the data readings are properly processed and stored in a dedicated database.

The near-field display 2 is built on a mini LCD screen with a bright backlight and an optical prism allowing a wide-angle field of vision, a visible band camera 3 records images from the scene of action and the compressed video stream is transmitted via CPU to the command center, an integrated thermal imaging camera has a radiometry function. In addition, the image from the thermal imaging camera 4 is fed directly to the mini near-field display 2 of the firefighter, the sensor module 5 of the rescuer's physiological parameters and accelerometer sensors are mounted in the helmet housing at the point of contact with the skin and the information from the sensors is transmitted to the CPU of the networked Smart helmet.

Although exemplary implementations of the invention have been depicted and described in detail herein, it will be apparent to those skilled in the relevant art that various modifications, additions, substitutions, and the like can be made without departing from the spirit of the invention. These are therefore considered to be within the scope of the invention as defined in the following claims.

It is to be understood that the above description is intended to be illustrative and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the invention parameters, they are by no means limiting but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A smart rescue helmet for use by a rescuer at an action site, comprising:
    an outer shell in a hemisphere-like shape;
    a shock absorbing canopy and a retention system;
    a rotating visor in a front part of the helmet;
    a control module comprising a microcomputer contained inside the smart rescue helmet including wireless communications means with an external control application;
    a near-field display;
    a visible band camera;
    a thermal imaging camera;
    a sensor module adapted for mounting on an interior surface of the outer shell monitoring physiological parameters along with a position of the rescuer, including skin-contact physiological sensors; and
    a communication system with a command center where data readings are processed accordingly and stored in a dedicated database;
    wherein the near-field display comprises a mini-LCD screen with a bright backlight providing 1000 nits and an optical prism allowing for a wide-angle field of vision and is adapted for hands-free operation;
    wherein the visible band camera records an image from the action site,. and a compressed video stream is transmitted via the control module to the command center;
    wherein the thermal camera has a radiometry function and a video feed from the thermal imaging camera is fed directly to the near-field display;
    wherein the sensor module of the rescuer's physiological parameters and accelerometer sensors are mounted within the outer shell in contact with skin of the rescuer, and information from the sensors is transmitted to the control module;
    wherein readings of vital signs are combined to determine direction and distance of other helmets in proximity to the smart rescue helmet.

2. The smart rescue helmet according to claim 1, wherein the control module also controls a battery power circuit, a wireless communication circuit, a thermal imaging camera circuit, a video camera circuit, a near-field display circuit, and monitors the physiological parameters sensors, and data from at least one accelerometer.

3. The smart rescue helmet according to claim 1, wherein the optical prism of the near-field display allows for a field of vision of at least 17 degrees and having an illumination of 1000 nit allows for a clear image regardless of external lighting conditions.

4. The smart rescue helmet according to claim 1, wherein the thermal imaging camera comprises a longwave detector in an infrared band LWIR with a mechanical shutter.

5. The smart rescue helmet according to claim 1, wherein the video feed of the thermal imaging camera is configurable in several color variants according to the action being carried out, a selection of the color variant being made wirelessly by means of an application on a smartphone to which the control module connects upon activation.

6. The smart rescue helmet according to claim 1, wherein sensors of vital function parameters of rescuer together with the parameters of all modules are broadcast via Bluetooth in form of simple messages and the smart helmet scans the readings, determines the direction and distance from which each message was transmitted and transmits them to the command center using MQTT information exchange protocol together with information about time when each message was transmitted by a source device.

7. The smart rescue helmet according to claim 1 wherein said helmet is adapted for use especially by a firefighter.

* * * * *